United States Patent
Jung et al.

(10) Patent No.: US 10,870,407 B2
(45) Date of Patent: Dec. 22, 2020

(54) AIRBAG APPARATUS FOR VEHICLE

(71) Applicant: AUTOLIV DEVELOPMENT AB, Vårgårda (SE)

(72) Inventors: Yong Hyun Jung, Hwaseong-si (KR); Dae Chang Jung, Hwaseong-si (KR); Tae Ik Gwon, Hwaseong-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 184 days.

(21) Appl. No.: 15/771,294

(22) PCT Filed: Aug. 26, 2016

(86) PCT No.: PCT/KR2016/009531
§ 371 (c)(1),
(2) Date: Jun. 26, 2018

(87) PCT Pub. No.: WO2017/073899
PCT Pub. Date: May 4, 2017

(65) Prior Publication Data
US 2018/0326939 A1   Nov. 15, 2018

(30) Foreign Application Priority Data
Oct. 29, 2015   (KR) .................. 10-2015-0151045

(51) Int. Cl.
*B60R 21/232* (2011.01)
*B60R 21/2338* (2011.01)
(Continued)

(52) U.S. Cl.
CPC .......... *B60R 21/232* (2013.01); *B60R 21/203* (2013.01); *B60R 21/21* (2013.01);
(Continued)

(58) Field of Classification Search
CPC .... B60R 2021/0009; B60R 2021/0023; B60R 2021/0048; B60R 2021/23107;
(Continued)

(56) References Cited

U.S. PATENT DOCUMENTS 5,044,663 A * 9/1991 Seizert .................. B60R 21/233
264/515
5,464,250 A * 11/1995 Sato .................. B60R 21/23138
280/730.1
(Continued)

FOREIGN PATENT DOCUMENTS

| JP | H11-208410 A | 8/1999 |
| JP | 2008-290529 A | 12/2008 |

(Continued)

OTHER PUBLICATIONS

International Search Report for PCT/KR2016/009531, ISA/KR, Daejeon, dated Nov. 21, 2016, with English translation.
(Continued)

*Primary Examiner* — Laura Freedman
(74) *Attorney, Agent, or Firm* — Stephen T. Olson; Harness, Dickey & Pierce, P.L.C.

(57) ABSTRACT

An airbag device for a vehicle includes a curtain airbag that is deployed downward along an inner side surface of a vehicle; and a driver's seat airbag that expands from inside the steering wheel of the vehicle toward the rear of the vehicle, and is configured so that when the curtain airbag and the driver's seat airbag expand, a thickness portion of the driver's seat airbag along a direction of front to back of the vehicle is arrested by the inner face of the leading edge of the curtain airbag, keeping the head of the driver from pushing aside the curtain airbag and the driver's seat airbag and being projected toward the front of the vehicle.

17 Claims, 5 Drawing Sheets

(51) Int. Cl.
  *B60R 21/213*    (2011.01)
  *B60R 21/203*    (2006.01)
  *B60R 21/21*     (2011.01)
  *B60R 21/231*    (2011.01)
  *B60R 21/233*    (2006.01)
(52) U.S. Cl.
  CPC ........ *B60R 21/213* (2013.01); *B60R 21/2338* (2013.01); *B60R 21/23138* (2013.01); *B60R 2021/23107* (2013.01); *B60R 2021/23308* (2013.01)
(58) Field of Classification Search
  CPC ........... B60R 2021/23308; B60R 2021/23316; B60R 2021/23382; B60R 2021/23386; B60R 21/203; B60R 21/232; B60R 21/21; B60R 21/213; B60R 21/23138; B60R 21/2338
  See application file for complete search history.

(56) References Cited

U.S. PATENT DOCUMENTS

| | | | | |
|---|---|---|---|---|
| 7,195,275 | B2* | 3/2007 | Abe | B60R 21/231 |
| | | | | 280/729 |
| 7,314,233 | B2* | 1/2008 | Kino | B60R 21/213 |
| | | | | 280/730.2 |
| 7,654,560 | B2* | 2/2010 | Yokoyama | B60R 21/232 |
| | | | | 280/729 |
| 7,661,700 | B2* | 2/2010 | Imamura | B60R 21/203 |
| | | | | 280/730.1 |
| 7,784,823 | B2* | 8/2010 | Heigl | B60R 21/232 |
| | | | | 280/730.2 |
| 7,896,387 | B2 | 3/2011 | Ideue | |
| 8,636,301 | B1* | 1/2014 | Wang | B60R 21/232 |
| | | | | 280/730.2 |
| 8,764,053 | B1* | 7/2014 | Dix | B60R 21/203 |
| | | | | 280/729 |
| 8,894,094 | B2* | 11/2014 | Wang | B60R 21/232 |
| | | | | 280/730.2 |
| 8,967,660 | B2* | 3/2015 | Taguchi | B60R 21/233 |
| | | | | 280/729 |
| 8,998,250 | B2 | 4/2015 | Kruse et al. | |
| 9,266,494 | B2* | 2/2016 | Wang | B60R 21/237 |
| 9,272,682 | B2* | 3/2016 | Wang | B60R 21/232 |
| 9,296,360 | B2 | 3/2016 | Komamura | |
| 9,469,269 | B2* | 10/2016 | Hiruta | B60R 21/232 |
| 9,487,180 | B2* | 11/2016 | Nakashima | B60R 21/233 |
| 9,539,978 | B2* | 1/2017 | Mazanek | B60R 21/232 |
| 9,701,272 | B2* | 7/2017 | Massa | B60R 21/213 |
| 9,744,936 | B2* | 8/2017 | Kruse | B60R 21/232 |
| 9,776,593 | B2* | 10/2017 | Je | B60R 21/232 |
| 9,862,347 | B2* | 1/2018 | Deng | B60R 21/231 |
| 9,994,184 | B2* | 6/2018 | Deng | B60R 21/0136 |
| 9,994,186 | B2* | 6/2018 | Fukawatase | B60R 21/232 |
| 10,023,148 | B2* | 7/2018 | Choi | B60R 21/213 |
| 10,106,119 | B2* | 10/2018 | Oh | B60R 21/21 |
| 10,131,314 | B2* | 11/2018 | Yoo | B60R 21/239 |
| 10,322,693 | B2* | 6/2019 | Yoo | B60R 21/233 |
| 10,501,044 | B2* | 12/2019 | Moon | B60R 21/214 |
| 10,525,924 | B2* | 1/2020 | Abe | B60R 21/206 |
| 2008/0296876 | A1 | 12/2008 | Ideue | |
| 2013/0270805 | A1 | 10/2013 | Kruse et al. | |
| 2014/0203541 | A1 | 7/2014 | Wei et al. | |
| 2015/0054267 | A1 | 2/2015 | Komamura | |
| 2016/0200281 | A1* | 7/2016 | Takeshita | B60R 21/233 |
| | | | | 280/730.2 |
| 2018/0354448 | A1* | 12/2018 | Moon | B60R 21/233 |
| 2019/0126879 | A1* | 5/2019 | Shimizu | B60R 21/213 |
| 2019/0225183 | A1* | 7/2019 | Garnier | B60R 21/207 |
| 2020/0023803 | A1* | 1/2020 | Nakajima | B60R 21/233 |

FOREIGN PATENT DOCUMENTS

| | | | | |
|---|---|---|---|---|
| JP | 2015-040017 A | | 3/2015 | |
| JP | 2016130043 A | * | 7/2016 | ........ B60R 21/23138 |
| JP | 2017056802 A | * | 3/2017 | ........... B60R 21/203 |
| JP | 2018075962 A | * | 5/2018 | |
| KR | 2013-0097226 A | | 9/2013 | |

OTHER PUBLICATIONS

Written Opinion of the ISA for PCT/KR2016/009531, ISA/KR, Daejeon, dated Nov. 21, 2016.

* cited by examiner

[Fig. 1]
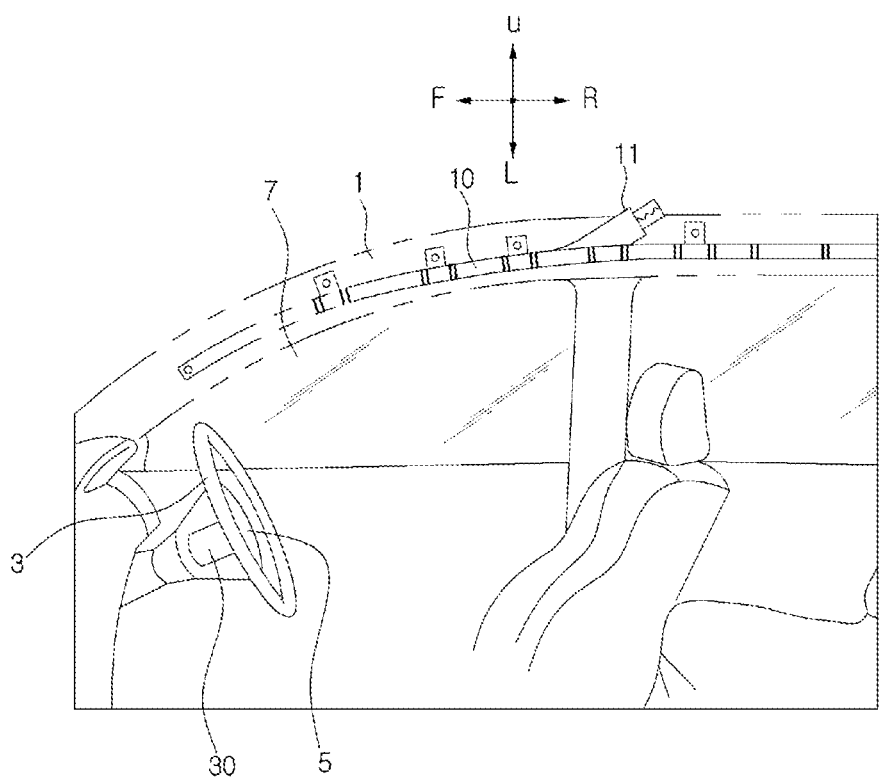

[Fig. 2]
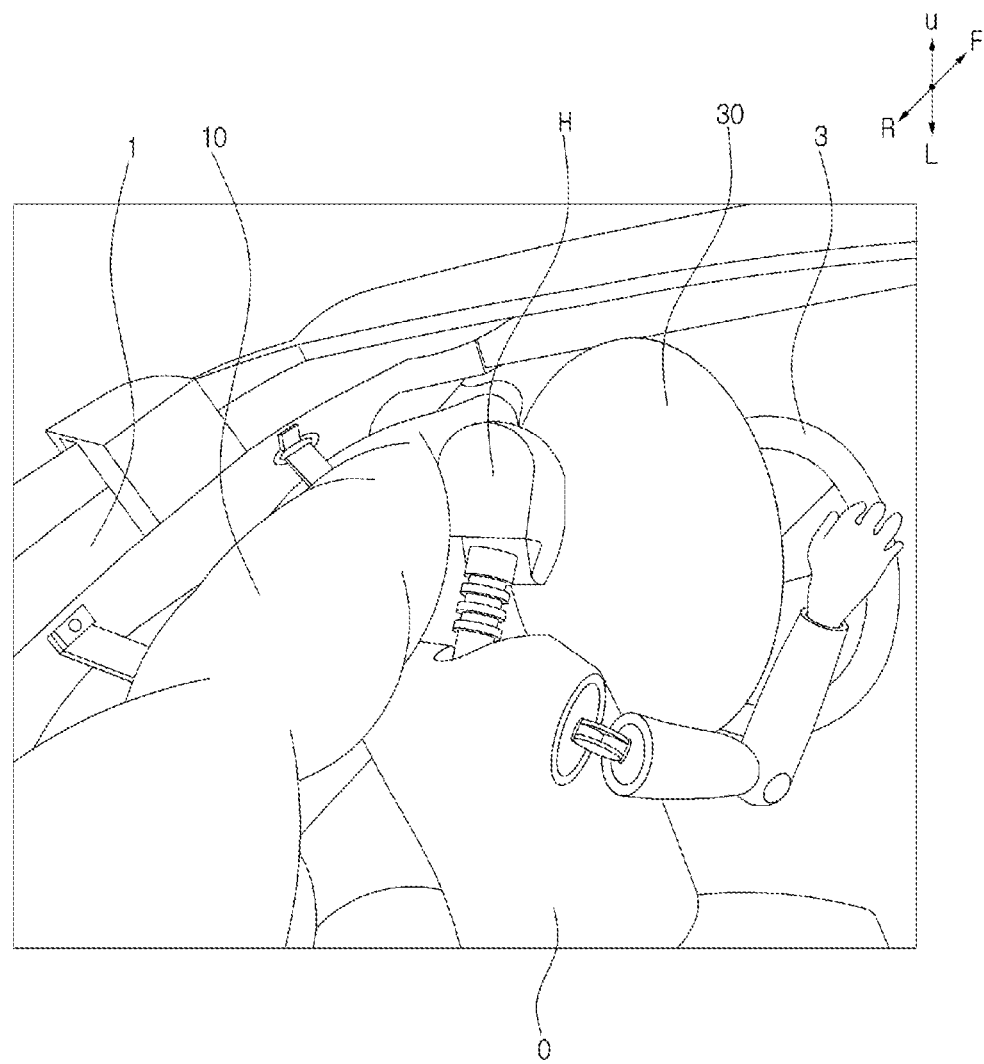

[Fig. 3]
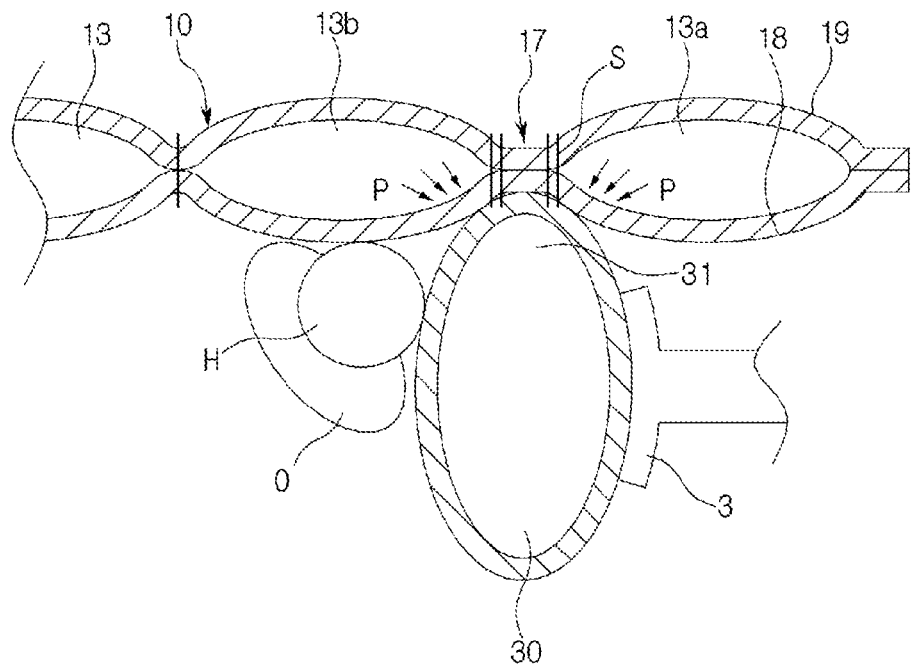
[Fig. 4]
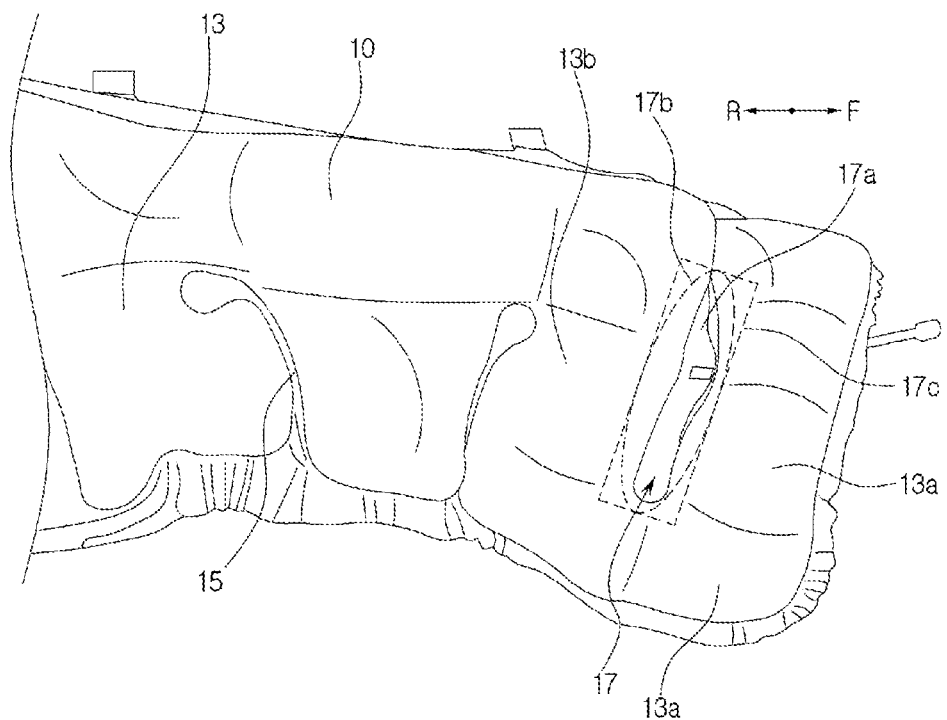

[Fig. 5]
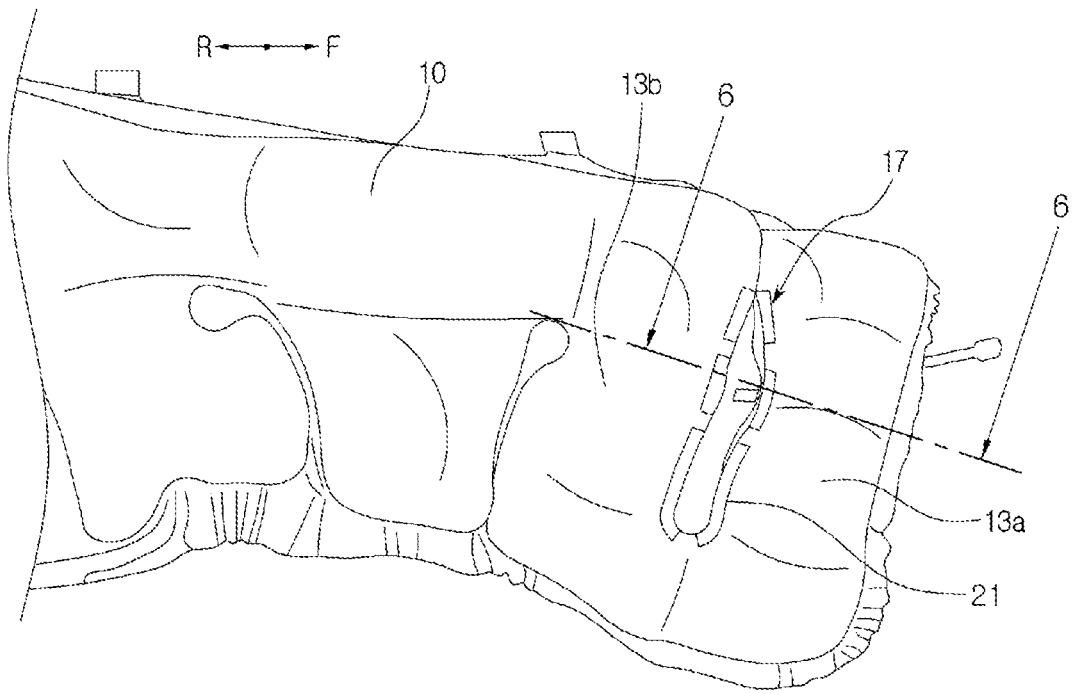
[Fig. 6]
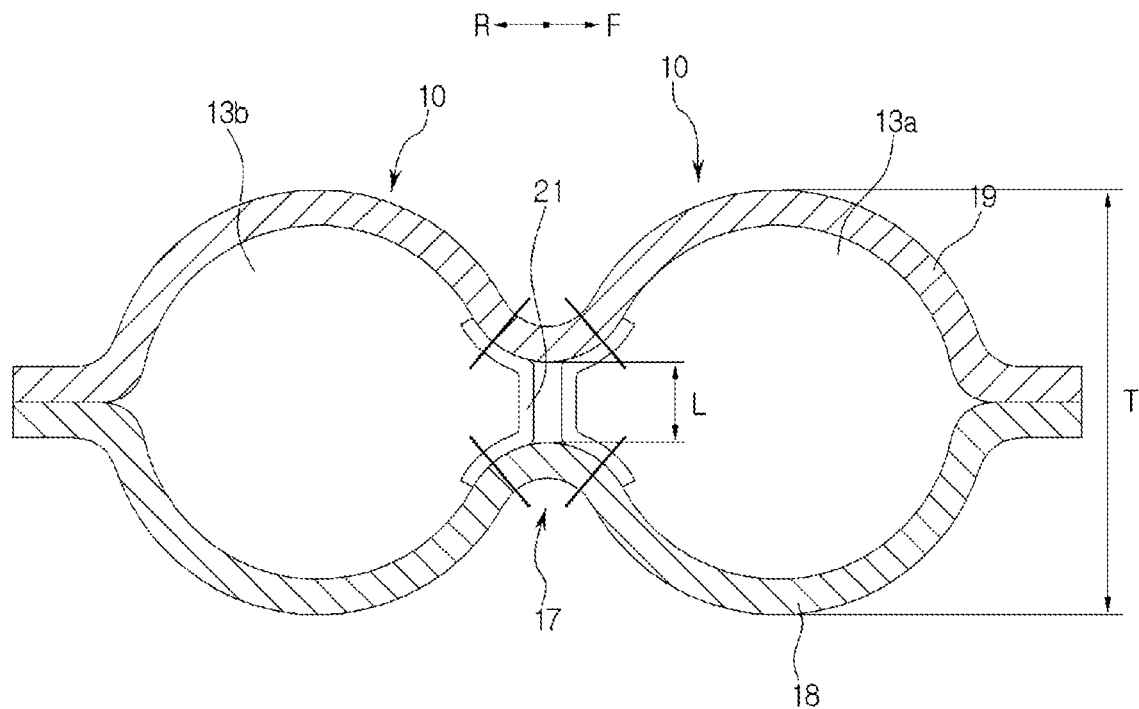

[Fig. 7]
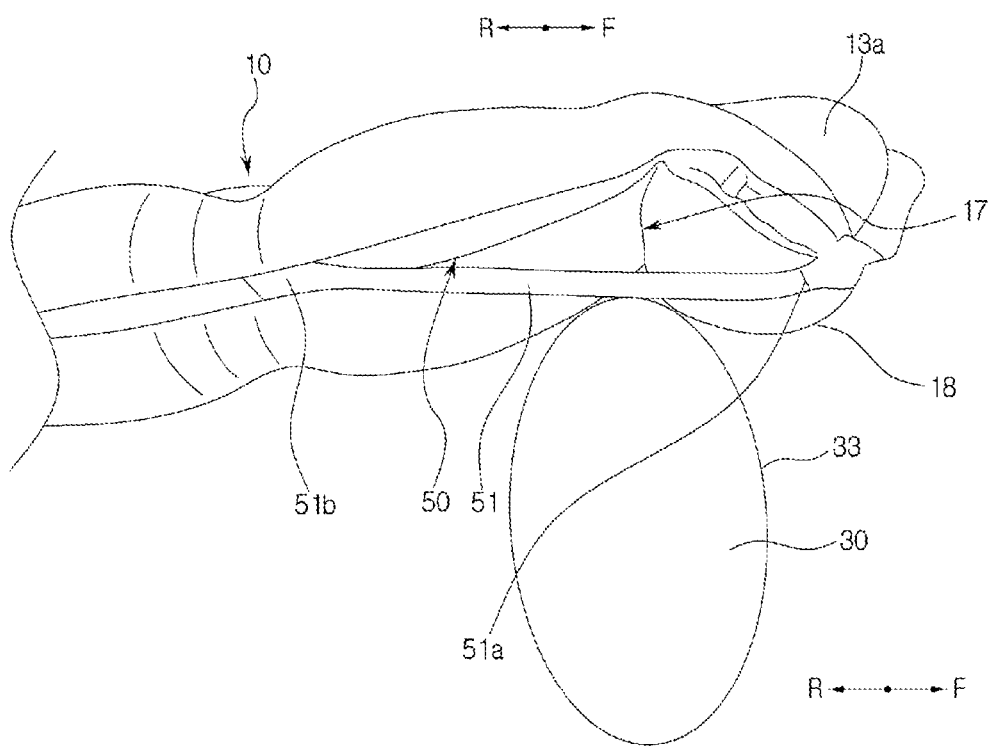

AIRBAG APPARATUS FOR VEHICLE

CROSS-REFERENCE TO RELATED APPLICATIONS

This application is a 371 U.S. National Stage of International Application No. PCT/KR2016/009531, filed Aug. 26, 2016, which claims priority to Korean Patent Application No. KR 10-2015-0151045, filed Oct. 29, 2015. The entire disclosures of the above applications are incorporated herein by reference.

TECHNICAL FIELD

The present invention relates to an airbag device for a vehicle having an improved side curtain airbag configured to be expanded and deployed along the inner side of a vehicle in the event of a side impact or roll-over of a vehicle.

BACKGROUND ART

Recently, high levels of vehicle safety have become required. This trend is shared throughout the world, and currently, most vehicles are equipped with airbags as a vehicle safety device. Companies involved in vehicle development have adopted a policy of sustained improvements to safety. Accordingly, new airbag devices are being continually developed.

Standards by which vehicle safety is evaluated vary from country to country, and corporations engage in product development so that their products satisfy evaluation standards in multiple countries. In the United States, with the largest number of vehicles in the world, for example, the Federal Motor Highway Traffic Safety Standards (FMVSS) are enacted by the National Highway Traffic Safety Administration (NHTSA). In the notice of proposed rule enactments for the FMVSS issued by the NHTSA, a requirement with the aim of "using a projection damping system to reduce the likelihood of passengers flying out of the vehicle through the side windows in the event of a side impact or roll-over" is proposed. This requirement can be met by providing a side curtain airbag as a device intended to reduce projection from a vehicle.

A vehicle side curtain airbag is installed longitudinally along the top of the interior of a vehicle so that it is deployed in the event of vehicle impact. A side curtain airbag is effective not only in cases of side impact but also in cases of roll-over accidents, providing passengers with a high level of safety.

When an inflator is triggered by an impact signal, the gases that explode in the inflator enter into the curtain airbag and expand the curtain airbag, and the expanding curtain airbag is deployed into the vehicle to protect passengers from impact with the vehicle.

Ordinarily, the inflator is disposed above the curtain airbag, and is configured so that expanding gases from the inflator enter the expansion chamber and inflate the inflation chamber.

Other airbag devices include driver's seat airbag devices mounted on the steering wheel, passenger's seat airbag devices mounted above the glove compartment, and knee airbag devices mounted on the instrument panel.

(Patent Literature 1) U.S. Pat. No. 7,967,334
(Patent Literature 2) U.S. Patent Publication Number: US 2013/023442

DETAILED DESCRIPTION OF THE INVENTION

Technical Problem

The purpose of the present invention is to provide a vehicle airbag device that prevents the head of a driver from passing between a side curtain airbag and a driver's seat airbag and being flung toward the front of the vehicle in the event of a vehicle collision.

Technical Solution

One embodiment of the present invention provides a vehicle curtain airbag device. The airbag device comprises: a curtain airbag that is deployed downward along an inner side surface of a vehicle, and; a driver's seat airbag that expands from inside the steering wheel of the vehicle toward the rear of the vehicle, and is configured so that when the curtain airbag and the driver's seat airbag expand, the thick portion of the driver's seat airbag along a direction of front to back of the vehicle is arrested by the inner face of the leading edge of the curtain airbag, keeping the head of the driver from pushing aside the curtain airbag and the driver's seat airbag and being projected toward the front of the vehicle.

On the front portion of the curtain airbag, a groove portion may be formed longitudinally in the longitudinal direction of the curtain airbag so that the thick portion of the driver's seat airbag fits into the groove when expanding.

The groove portion may be in the shape of a line, an ellipse, or a rectangle.

The groove portion may comprise a non-inflatable area, or may be formed by a thickness restraining member that keeps the inflated thickness of the groove portion thinner than the thickness of the area around the groove portion.

Front and rear chambers neighboring the groove portion of the curtain airbag may be configured to have an internal inflation pressure to keep the driver's seat airbag inserted into the groove portion from moving along the longitudinal directional of the vehicle and to keep the driver's seat airbag arrested in a certain position.

The curtain airbag may further comprise, with the groove portion at the center, an arresting member which arrests the leading edge of the curtain airbag so that it projects toward the inside of the vehicle, thereby supporting the leading edge of the driver's seat airbag.

The arresting member may comprise a tether member which is disposed on the upper portion of the curtain airbag, whose one end is connected to the front of the curtain airbag centering on the groove portion, and whose other end is connected to the back of the curtain airbag centering on the groove portion.

Effects of the Invention

One embodiment of the present embodiment provides a vehicle airbag device, where the airbag device comprises: a curtain airbag that is deployed downward along an inner side surface of a vehicle, and; a driver's seat airbag that expands from inside the steering wheel of the vehicle toward the rear of the vehicle, and is configured so that when the curtain airbag and the driver's seat airbag expand, the thick portion of the driver's seat airbag along a direction of front to back of the vehicle is arrested by the inner face of the leading edge of the curtain airbag, keeping the head of the driver from pushing aside the curtain airbag and the driver's seat airbag and being projected toward the front of the vehicle.

BRIEF DESCRIPTION OF DRAWINGS

FIG. 1 is a side view illustrating the inside of a vehicle equipped with the airbag device according to one embodiment of the present invention.

FIG. 2 is a perspective view showing the inside of a vehicle wherein the curtain airbag and the driver's seat airbag according to one embodiment of the present invention have been inflated.

FIG. 3 is a cross section drawing showing the curtain airbag and the driver's seat airbag according to one embodiment of the present invention inflated.

FIG. 4 is a side view illustrating the configuration of the curtain airbag of the airbag device according to one embodiment of the present invention.

FIG. 5 is a side view illustrating the configuration of the curtain airbag of the airbag device according to another embodiment of the present invention.

FIG. 6 is a cross section along Line 6-6 of FIG. 5.

FIG. 7 is a cross section showing the curtain airbag according to another embodiment of the present invention inflated.

BEST MODE(S) FOR CARRYING OUT THE INVENTION

In the following, embodiments of the present invention will be described in further detail with reference to the attached drawings. It shall be understood, however, that the present invention is not limited to the embodiments disclosed in the following, but may be realized in a variety of different forms, and that the embodiments are provided to make the disclosure of the present invention more complete so as to fully inform a PHOSITA as to the scope of the present invention.

In the following, "U" indicates the upper direction of the vehicle, "L" indicates the lower direction of the vehicle, "F" indicates the front direction of the vehicle, and "R" indicates the rear direction of the vehicle.

FIG. 1 is a side view illustrating the inside of a vehicle equipped with the airbag device according to one embodiment of the present invention, and FIG. 2 is a perspective view showing the inside of a vehicle wherein the curtain airbag and the driver's seat airbag according to one embodiment of the present invention have been inflated.

Referring to FIG. 1 and FIG. 2, the side curtain airbag (10, hereinafter referred to as "the curtain airbag") comprises an inflator (11) that generates gas. The curtain airbag (10) is inflated by the pressure of gas supplied by the inflator (11) and arrests the passenger.

The curtain airbag (10) is accommodated in a folder state inside a roof side rail (1) in the top of the side of the interior of the vehicle. The roof side rail (1) is covered by roof trim and is not visible from inside the vehicle.

In the event of a side impact or side roll-over of the vehicle, sensors (not illustrated) provided in the vehicle detect the impact and send an ignition signal to the inflator (11). Then, an explosive ignites inside the inflator (11), generating gas, and the generated gas is supplied into the curtain airbag (10). When gas is supplied by the inflator (11), an expanding area of the curtain airbag (10) is deployed downward among the side of the interior of the vehicle (side windows, etc.) to protect passengers.

Meanwhile, in the event of vehicle impact, a driver's seat airbag (30) accommodated inside a steering wheel (3) expands toward the rear of the vehicle and arrests the passenger.

The steering wheel airbag (30) is accommodated in folded state inside the steering wheel (3). The steering wheel (3) is covered by a steering wheel cover (5) and is not visible from inside the vehicle.

The driver's seat airbag (30), according to an operating principle similar to that of the curtain airbag (10), is supplied with gas from a driver's seat inflator (not illustrated) and deploys toward the rear of the vehicle, that is, the passenger. The driver's seat airbag (30) has an approximately circular shape centering on the center of the steering wheel (3), and expands to have a certain thickness along the front to rear direction of the vehicle.

The thickness portion of the driver's seat airbag (30), which faces the sides of the vehicle, is arrested by the inner face of the side airbag (10). This keeps the head (H) of the passenger from making its way between the side airbag (10) and the driver's seat airbag (30) and being thrown toward the front or the side of the vehicle. Thereby, the head (H) of a passenger (O) is kept from impacting structures in the front corner of the vehicle, for example the front pillar or the edge of the instrument panel.

FIG. 3 is a cross section drawing showing the curtain airbag and the driver's seat airbag according to one embodiment of the present invention inflated, and FIG. 4 is a side view illustrating the configuration of the curtain airbag of the airbag device according to one embodiment of the present invention.

Referring to FIG. 3 and FIG. 4, in the curtain airbag (10), a series of chambers (13) that are deployed downward along the side (7, see. FIG. 1) of the vehicle, for example, along the side windows, etc., are disposed in a direction of front to rear (F, R) of the vehicle.

The chamber (13) is compartmentalized by chamber walls (15). The front side of the curtain airbag (10) comprises a groove portion (17) that arrests the side thickness portion (31) of the driver's seat airbag (30).

The groove portion (17) is formed longitudinally approximately along the longitudinal direction of the curtain airbag (10). The groove portion (17) may be approximately a straight line (17a), a vertically elongated ellipse (17b), a tall rectangle (17c), or any suitable shape. The groove portion (17) may be a non-expanding area or a thickness-regulated area.

FIG. 4 shows the formation of the groove portion (17) by a non-expanding area. The non-expanding area may be formed by overlapping the inner panels (18) and outer panels (19) forming the curtain airbag (10), and through a seam line (S) sewn in the shape described in the above. That is, the internal area defined by the seam line (S) is blocked off from the supply of gas and does not expand. The groove portion (17) is formed in a position corresponding to the thickness portion (31) of the driver's seat airbag (30) and accommodates the thickness portion (31) of the driver's seat airbag (30).

Here, the curtain airbag (10) is required to have a suitable bearing strength so that it can arrest the thickness portion (31) of the driver's seat airbag (30) to a certain position. To this end, preferably, the chambers (13a, 13b) disposed in front of and behind the groove portion (17) have an internal pressure (P) sufficiently able to support the thickness portion (31) of the driver's seat airbag (30). FIG. 5 is a side view illustrating the configuration of the curtain airbag of the airbag device according to another embodiment of the present invention, and FIG. 6 is a cross section along Line 6-6 of FIG. 5.

Referring to FIG. 5 and FIG. 6, the groove portion (17) of the curtain airbag (10) may comprise a thickness-regulated area. The thickness-regulated area may be formed by an internal tether (21) connecting the inner and outer panels (18, 19) of the airbag (10). The internal tether (21) has a length (L) shorter than the inflated thickness (T) of the chamber (13a, 13b).

The internal tether (21), as illustrated in FIG. 5, may be in the form of a plurality of pairs, for example three pairs, along the vertical length of the curtain airbag (10). Another embodiment may include one pair of internal tethers (21).

FIG. 7[A1] is a cross section showing the curtain airbag according to another embodiment of the present invention inflated.

Referring to FIG. 7, the leading edge of the curtain airbag (10) is configured to project into the vehicle to increase the arresting ability of the driver's seat airbag (30). To this end, a deployment arresting member (50) may be disposed above the curtain airbag (10). The deployment arresting member (50) may comprises a tether member (51) having one end (51a) which is connected to the leading edge of the curtain airbag (10), and an opposite end (51b) that extends toward the rear of the vehicle and is connected to a certain position on the top of the curtain airbag (10).

One end (51a) of the tether member (51) is connected to the leading edge of the curtain airbag (10), and the opposite end (51b) of the tether member (51) is connected to the rear portion with the groove portion (17) at the center.

Due to this configuration, when the curtain airbag (10) is expanded and deployed, the curtain airbag (10) is arrested so that the leading edge of the curtain airbag (10), that is the front chambers (13a) with respect to the groove portion (17), project into the vehicle. The inner panels (18) of the front chambers (13a) projecting into the vehicle come into contact with the front face (33) of the driver's seat airbag (30) and arrest the driver's seat airbag (30).

In the following, the operating principle of the airbag device comprised as described in the above is explained.

Referring to FIG. 1 and FIG. 2, when a vehicle impact occurs, a control device (not illustrated) detects a side impact based on signals from sensors (not illustrated), and the control device triggers an inflator (11). When the inflator (11) expends gas into the curtain airbag (10), the curtain airbag (10) is deployed downward along the side (7) of the vehicle, for example along the side windows, etc.

Meanwhile, a driver's seat airbag (30) accommodated in the steering wheel (3) is deployed and expands toward the rear (R) of the vehicle by an operating principle similar to that of the curtain airbag (10). Here, the thickness portion of the driver's seat airbag (30) which faces the side of the vehicle is arrested by the inner face of the curtain airbag (10) and keeps the head (H) of the passenger (O) from passing between the curtain airbag (10) and the driver's seat airbag (30) and being flung toward the front of the vehicle. Thereby, the passenger is protected.

Referring to FIG. 3 through FIG. 6, when the curtain airbag (10) expands, a groove portion (17) is formed toward the front of the curtain airbag (10). The groove portion (17) is formed in a location corresponding to the thickness portion (31) of the driver's seat airbag (30), and the thickness portion (31) of the expanded driver's seat airbag (31) locks into and is arrested by the groove portion (17). Here, the chambers (13a, 13b) neighboring the groove portion (17) of the curtain airbag (10) maintain sufficient internal pressure to keep the driver's seat airbag (30) arrested in a certain position, keeping the driver's seat airbag (30) from breaking away from the curtain airbag (10).

By the thickness portion (31) of the driver's seat airbag (31) being fitted into the groove portion of the curtain airbag (10) in this manner, the space between the curtain airbag (10) and the driver's seat airbag (31) is blocked off. Thereby, the head (H) of the passenger (10) is arrested by fitting between the curtain airbag (10) and the driver's seat airbag (31), and is kept from moving toward the front of the vehicle. This way, the head (H) of the passenger (O) is kept from coming into contact with, and being injured by, structures toward the front of the vehicle, for example, the front pillar, front side door, or the instrument panel.

Referring to FIG. 7, the curtain airbag (10) is arrested by a deployment arresting member (50), for example a tether member (51) whose one end (51a) is connected to the leading edge of the curtain airbag (10) and whose opposite end (51b) is connected to the top [of the curtain airbag (10) toward the rear (R) with respect to the groove portion (17). This way, when expanding, the leading edge of the curtain airbag (10), substantially the front chamber (13a) of the groove portion (17) is arrested so that it projects into the vehicle. The inner panel (18) of the projected chamber (13a) comes in contact with the front face (33) of the driver's seat airbag (30) and supports the driver's seat airbag (30).

Accordingly, the driver's seat airbag (30) is more solidly supported by the groove portion (17) of the curtain airbag (10), and kept from breaking away from the curtain airbag (10), and this also improves its ability to stop the head of the passenger (O).

Whereas the present invention has been explained with reference to the attached drawings and the preferable embodiments described in the above, the present invention is not limited to these, but is defined by the appended claims. Accordingly, a person having ordinary skill in the art may modify and change the present invention in a scope not departing from the technical idea of the appended claims.

What is claimed is:

1. A vehicle airbag arrangement, the vehicle airbag arrangement comprising:
   a driver's seat airbag for expansion from inside a steering wheel of a vehicle toward a rear of the vehicle, the driver's seat airbag having a thickness portion along a direction of front to back of the vehicle; and
   a curtain airbag for deployment downward along an inner side surface of the vehicle, the curtain airbag elongated having a length in a longitudinal direction greater than a height in a vertical direction, the curtain airbag having an inner panel, an outer panel and a groove portion for receiving the thickness portion of the driver's seat airbag, the groove portion having a width in the longitudinal direction, the curtain airbag further including at least a first pair of internal tethers attached to the inner panel at spaced apart points to define the width of the groove portion,
   wherein the internal tethers of the first pair of internal tethers longitudinally spaced from one another.

2. The vehicle airbag arrangement according to claim 1, wherein the groove portion is in a form selected from a group consisting of a line, an ellipse, and a rectangle.

3. The vehicle airbag arrangement according to claim 1, wherein front and rear chambers neighboring the groove portion of the curtain airbag are configured to have an internal expansion pressure to keep the driver's seat airbag arrested in a certain position.

4. The vehicle arrangement according to claim 1, wherein the curtain airbag further comprises an arresting member that arrests a leading edge of the curtain airbag so that the curtain airbag projects toward the inside of the vehicle and supports a front face of the driver's seat airbag.

5. The vehicle airbag arrangement according to claim 4, wherein the arresting member is provided on the top of the curtain airbag, the arresting member comprising a tether member with one end connected to the leading edge of the curtain airbag and an opposite end connected to a portion of the curtain airbag on a rear side of the groove portion.

6. A method of protecting a vehicle occupant with the vehicle airbag arrangement of claim 1, the method comprising:
   deploying the curtain airbag downward along the inner side surface of the vehicle;
   deploying the driver's seat airbag from inside the steering wheel of the vehicle toward the rear of the vehicle; and
   arresting the thickness portion of the driver's seat airbag along the direction of front to back of the vehicle with an inner face of a leading edge of the curtain airbag to thereby prevent a head of a driver of the vehicle from pushing aside the curtain airbag and the driver's seat airbag and being projected toward the front of the vehicle.

7. The method of claim 6, further comprising fitting the thickness portion of the driver's seat airbag into the groove portion of the curtain airbag.

8. The vehicle airbag arrangement of claim 1, wherein the groove portion is vertically spaced from both an upper longitudinal side of the curtain airbag and a lower longitudinal side of the curtain airbag.

9. The vehicle airbag arrangement of claim 1, wherein the groove is defined by a plurality of pairs of internal tethers, the internal tethers of each pair of internal tethers longitudinally spaced from one another and adjacent pairs of internal tethers spaced from one another in a vertical direction.

10. The vehicle airbag arrangement of claim 9, wherein a first internal tether of each plurality of internal tethers is attached at a first point to the inner panel and a second internal tether is attached at a second point to the inner panel, the first and second points longitudinally spaced apart to define the width of the groove portion at the inner panel.

11. The vehicle airbag arrangement of claim 10, wherein the first internal tether of each plurality of internal tethers is attached at a third point to the outer panel and the second internal tether is attached at a fourth point to the outer panel, the third and fourth points longitudinally spaced apart to define the width of the groove portion at the outer panel.

12. A curtain airbag comprising:
   an inner panel elongated in a longitudinal direction of the curtain airbag;
   an outer panel secured to the inner panel and elongated in the longitudinal direction of the curtain airbag;
   a groove portion in the inner panel, the groove portion having a width in the longitudinal direction of the curtain airbag, and
   at least a first pair of internal tethers cooperating to define the width of the groove portion, each pair of internal tethers including a first internal tether and a second internal tether longitudinally spaced from the first internal tether, each first internal tether attached to the inner panel and the outer panel, each second internal tether attached to the inner panel and the outer panel,
   wherein the curtain airbag has a length in the longitudinal direction greater than a height in a vertical direction,
   wherein the groove portion is vertically spaced from both an upper longitudinal side of the airbag and a lower longitudinal side of the curtain airbag.

13. The curtain airbag of claim 12, wherein the groove portion is further in the outer panel.

14. The curtain airbag of claim 12, wherein the at least first pair of internal tethers includes a plurality of pairs of internal tethers.

15. The curtain airbag of claim 14, wherein adjacent pairs of the plurality of pairs of internal tethers are vertically spaced apart.

16. The curtain airbag of claim 12, wherein the first internal tether of each pair of internal tethers is attached at a first point to the inner panel and the second internal tether of each pair of internal tethers is attached at a second point to the inner panel, the first and second points longitudinally spaced apart to define the width of the groove portion at the inner panel.

17. A vehicle airbag arrangement, the vehicle airbag arrangement comprising:
   a driver's seat airbag for expansion from inside a steering wheel of a vehicle toward a rear of the vehicle, the driver's seat airbag having a thickness portion along a direction of front to back of the vehicle; and
   a curtain airbag for deployment downward along an inner side surface of the vehicle, the curtain airbag elongated having a length in a longitudinal direction greater than a height in a vertical direction, the curtain airbag having an inner panel, an outer panel and a groove portion for receiving the thickness portion of the driver's seat airbag, the groove portion having a width in the longitudinal direction, the curtain airbag further including at least a first pair of internal tethers attached to the inner panel at spaced apart points to define the width of the groove portion,
   wherein the groove portion is defined by a plurality of internal tethers, adjacent tethers of the plurality of internal tethers spaced from one another in the vertical direction.

* * * * *